(12) United States Patent
Shiffler, Jr. et al.

(10) Patent No.: US 7,169,437 B1
(45) Date of Patent: Jan. 30, 2007

(54) METHOD OF COATING AN ANODE/COLLECTOR WITH CARBON NANOTUBES

(75) Inventors: Donald A. Shiffler, Jr., Albuquerque, NM (US); Michael D. Haworth, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 404 days.

(21) Appl. No.: 10/445,976

(22) Filed: May 27, 2003

Related U.S. Application Data

(62) Division of application No. 09/683,047, filed on Nov. 13, 2001, now Pat. No. 6,645,628.

(51) Int. Cl.
*B05D 5/12* (2006.01)

(52) U.S. Cl. .................. 427/77; 427/249.2; 427/249.3

(58) Field of Classification Search .................. 427/77, 427/249.2, 249.3
See application file for complete search history.

(56) References Cited

U.S. PATENT DOCUMENTS

| | | | |
|---|---|---|---|
| 4,417,175 A | 11/1983 | Curren et al. | |
| 4,607,193 A | 8/1986 | Curren et al. | |
| 5,786,666 A | 7/1998 | Lauf et al. | |
| 5,916,642 A | 6/1999 | Chang | |
| 6,265,466 B1 | 7/2001 | Glatkowski et al. | |
| 6,322,713 B1 | 11/2001 | Choi et al. | |
| 6,331,690 B1 | 12/2001 | Yudasaka et al. | |
| 6,361,861 B2 | 3/2002 | Gao et al. | |
| 6,914,372 B1 * | 7/2005 | Akiyama et al. | ........... 313/309 |
| 2004/0043219 A1 | 3/2004 | Ito et al. | |

FOREIGN PATENT DOCUMENTS

| | | |
|---|---|---|
| EP | 1020888 A | 7/2000 |
| EP | 1276132 A | 1/2003 |
| JP | 3421549 | 6/1998 |
| JP | 2002-170480 | 6/2002 |
| WO | WO 01/39986 A1 | 6/2001 |

OTHER PUBLICATIONS

Brigitte Vigolo, et al., "Macroscopic Fibers and Ribbons of Oriented Carbon Nanotubes," *Science*, vol. 290, pp. 1331-1334, Nov. 17, 2000.

Ray Baughman, et al., "Carbon Nanotube Actuators," *Science*, vol. 284, pp. 1340-1344, May 21, 1999.

* cited by examiner

*Primary Examiner*—Bret Chen
(74) *Attorney, Agent, or Firm*—James M. Skorich

(57) ABSTRACT

The electron impact surface of an anode/collector is coated with a carbon nanotube coating to reduce the production of secondary electrons and, concomitantly, to suppress the formation of neutral gases and plasma. A carbonizable resin is first applied to the electron impact surface, followed by a coating comprised of carbon nanotubes. The coating is pyro-bonded to the surface by heating the anode/collector to over 700° C. in a non-oxidizing atmosphere. Next, the anode/collector is heated to over 1000° C. while a low-pressure hydrocarbon gas, for example, methane, is flowed over the carbon nanotube coating. The gas decomposes and creates a smooth, non-porous, rigid surface on the carbon nanotube coating. The anode/collector is then heated in a vacuum to evaporate any residual water in the carbon nanotube coating.

13 Claims, 2 Drawing Sheets

Un-Coated Anode at 475 kV

Coated Anode at 475 kV

METHOD OF COATING AN ANODE/COLLECTOR WITH CARBON NANOTUBES

This application is a division of pending U.S. application Ser. No. 09/683,047 filed on Nov. 13, 2001, and claims the benefit of the foregoing filing date now U.S. Pat. No. 6,645,628.

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND

The invention is in the field of vacuum tubes, and more particularly relates to a coated anode designed to reduce out-gassing, plasma formation, and secondary electron production.

Every vacuum electronics device, ranging from radio frequency tubes to microwaves tubes, must have some region in which the cathode emitted electrons impact after participating in the desired interactions. Generally these structures consist of stainless steel, oxygen free high conductivity (OFHC) copper or some other metal. Occasionally the metal is coated with an insulating material such as titanium nitride. Metals are generally the optimum structures due to the good electrical and thermal conductivity as well as the superior vacuum performance.

One major drawback with these materials is the production of secondary electrons, plasmas, and neutral gasses upon electron impact. Neutral gasses contribute to raising the pressure in the tube, reducing the vacuum. Plasmas not only increase the pressure but also cause the tube to short electrically, limiting the duration of microwave or radio frequency output. Plasmas can also cause damage other components, e.g., the cathode or other metallic structures. Secondary electrons are electrons produced by the impact of the primary electron beam. A single primary electron can produce several or as many as hundreds of secondary electrons. These secondary electrons then cause the formation of plasmas and result in further out-gassing from the metal anode or collector.

These problems are amplified when the collector is biased to allow energy recovery from the primary electron beam. Here, the secondary electrons can easily be re-accelerated back into the collector, causing a cascading process producing more secondary electrons. One method to reduce this effect is to coat the anode/collector with a carbon film. The carbon reduces, but does not eliminate the effects discussed above.

Accordingly, there is a need for an anode/collector that can significantly reduce the production of secondary electrons, plasma formation, and out-gassing of neutral gases.

SUMMARY

In a preferred embodiment, the anode/collector surface of a vacuum tube is coated with a carbon nanotube material having the longitudinal axis of at least a portion of the nanotubes running parallel to the surface. The anode/collector surface initially is comprised of carbon or a metal surface coated with a thin film of carbon. It is then coated with a carbonizable resin. The final coating can be a carbon nanotube felt-like material that is pyro-bonded to the anode surface, or nanotubes can be deposited on the anode by chemical vapor deposition or by evaporation and then pyro-bonded.

Other aspects and advantages of the present invention will become apparent from the following detailed description, taken in conjunction with the accompanying drawing, illustrating by way of example the principles of the invention.

DETAILED DESCRIPTION

Figure 1:
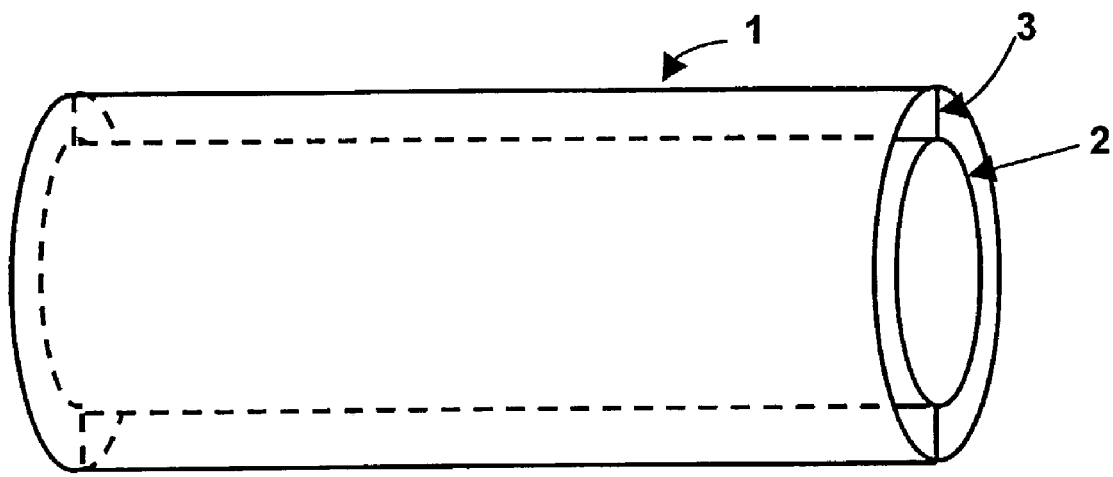
FIG. 1 illustrates a typical cylindrical anode/cathode configuration.

Conventional vacuum tube anodes/collectors produce secondary electrons from the impact of electrons from the cathode, along with plasmas and neutral gasses that degrade the performance of the tube. The carbon nanotube anode coating of the present invention significantly reduces these problems.

Carbon nanotubes are very small tube-shaped molecules having the structure of a graphite molecule rolled into a tube. Nanotubes have high conductivity along their longitudinal direction (z) and low conductivity in the transverse (r) direction. The carbon bonds are such that electrons are tightly bound in the p-orbits in the transverse direction and not readily dislodged. Thus, an anode coated with a carbon nanotube material that has at least a portion of the nanotubes lying parallel to the anode surface will produce few secondary electrons. Processes for fabricating single-walled carbon nanotubes into fibers and ribbon-like materials with preferentially oriented nanotubes are known in the art (Vigolo, Brigitte, et. al, "Macroscopic Fibers and Ribbons of Oriented Carbon Nanotubes," Science, Vol. 290, pp. 1331–1334, 17 Nov. 2000).

Nanotubes can be placed on an anode/collector surface coated with a carbonizable resin using chemical vapor deposition (CVD) or evaporation. (Carbon nanotubes are commercially available in powder form from Carbon Nanotechnologies, Inc., of Houston, Tex.) After the nanotubes have been deposited, the coating is then pyro-bonded to the anode/collector surface.

First, a carbon surface or a metal surface coated with a thin film of carbon is obtained in the shape of the desired anode. The electron impact surface is then coated with a carbonizable resin. A carbonizable resin, e.g. phenolic, is any resin that when heated sufficiently hot leaves only carbon in a solid state, generally a powder. The carbon nanotubes can be secured to the anode/collector surface using CVD onto the surface, which has been coated with a carbonizable resin.

The anode/collector part is then baked to greater than 7000 centigrade in a non-oxidizing atmosphere, decomposing the resin, and releasing volatile components. A porous carbon "char" residue embedded with carbon nanotubes is left on the surface. Next, chemical vapor deposition (CVD)

is used to infiltrate carbon into the porous char, creating a non-porous, rigid surface. This pyrocarbon material coating consists of a layer of carbon derived using pyrolysis through chemical vapor deposition (CVD). Pyrolysis through CVD is a process in which a low pressure hydrocarbon gas, methane for example, flows onto the part to be coated, is thermally decomposed, and deposits carbon on the part while releasing hydrogen. In particular, the carbonized part is heated to over 1000° centigrade while a low-pressure hydrocarbon gas is flowed onto it. The gas thermally decomposes, depositing carbon layers and releasing hydrogen. The length of the process depends on the size of the part to be coated, the number of layers required, and the gas flow rate. The thickness of the CVD film added depends on the thickness of the carbon nanotube coating, which depends on the degree of reduction required. The degree of reduction required depends on the exact parameters of the device to be used. The entire assembly is then placed in a vacuum bakeout at over 100° centigrade to remove any remaining water. The coating retains sufficient conductivity to conduct the incident electrons to the remainder of the pulsed circuit.

Carbon nanotubes can also be produced in a "felt" material, in which a significant portion of the nanotubes that form the fabric of the felt lie in the plane of the material. The felt consists of a polymer fabric into which ribbon-like carbon nanotube strips have been woven. (The source of this felt material is Dr. Otto Chou, Physics and Astronomy Department, University of North Carolina at Chapel Hill.) First, a carbon surface or a metal surface coated with a thin film of carbon is obtained in the shape of the desired anode. The electron impact surface is then coated with a carbonizable resin as previously described. The felt can be secured to the anode/collector surface by placing the felt on the surface which has been coated with a carbonizable resin and then heating the entire structure to greater than 1000° C. The felt is thus pyro-bonded to the anode/collector surface, forming a coating.

Figure 2:
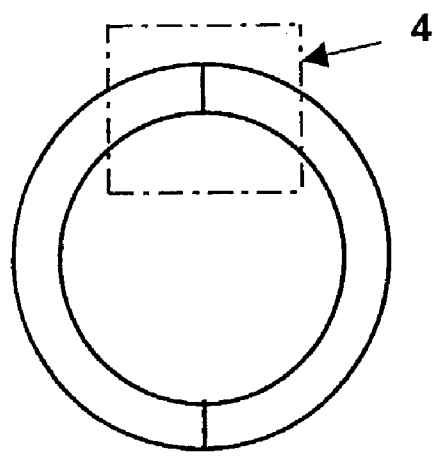
FIG. 2 is an end view of the cylindrical anode/cathode of FIG. 1

A significant reduction in secondary electrons was measured for carbon nanotube material having as little as five percent of the nanotubes parallel to the anode surface. At the same time, the cathode-produced electrons are conducted away by the anode parallel to the anode surface. Plasmas that normally would form due to secondary electron emission at 80 keV electron energies did not form until the electron energy exceeded 475 keV. For example, an anode structure having a cylindrical geometry is depicted in FIG. 1 with an end view shown in FIG. 2. A cathode 2 emits electrons that are accelerated to high energy towards the anode/collector 1. The cylindrical cathode is held in position within the cylindrical anode by a support 3. Electrons impact the anode at very high energy, leading to the production of neutral gas, plasma, and secondary electrons.

Figures 3, 4:
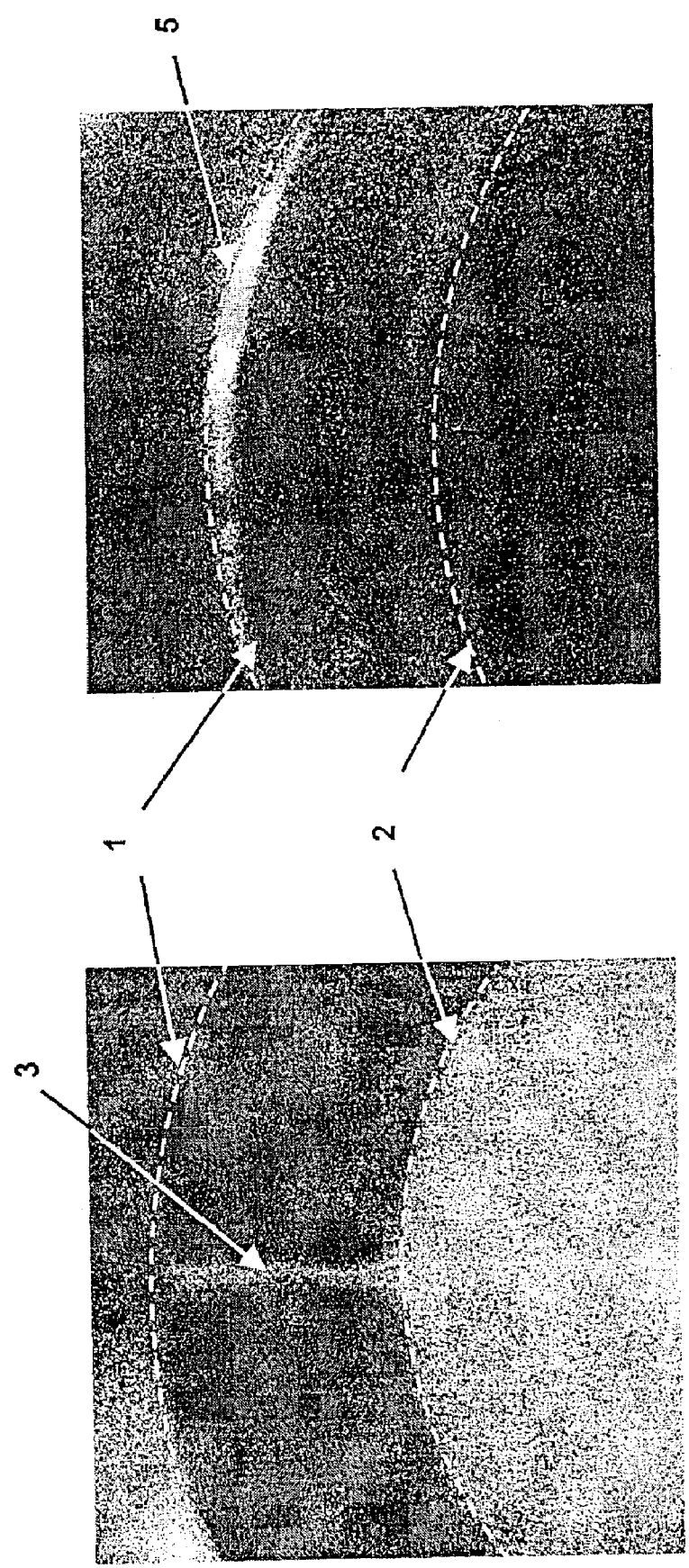
FIG. 3 is an end view of a portion of the cylindrical anode/cathode at 475 kV with the anode coated.
FIG. 4 is a low gain end view of a portion of the cylindrical anode/cathode at 475 kV with an uncoated anode.

FIG. 3 is a scanned photograph of a portion of the cylindrical anode/cathode (approximately encompassed by the FIG. 2 dashed line 4) where the anode 1 has been coated with the carbon nanotube material as described above. The potential difference between the cathode and the anode is 475 kV. No plasma formation can be seen. For comparison, the same cylindrical anode/cathode at 475 kV is shown in FIG. 4 but with an uncoated anode. This low-gain photo clearly shows the plasma formation 5. The plasma brightness in FIG. 4 necessitated the much-reduced gain of FIG. 4 relative to FIG. 3.

The carbon nanotube-based anode/collector coating has several advantages over previous metals and coatings. This coating can be used in high and low vacuum. The coating can be applied in a complex range of shapes. Secondary electron production, neutral gas (out-gassing) production, and plasma production are greatly reduced, permitting microwave and radio frequency vacuum electronics to be run with higher efficiency due to lower pumping requirements. Many devices have been limited in peak power and pulse duration by these effects. These coated anodes have applications ranging from cathode ray tubes in computers, televisions, and displays to microwave tubes in radar, communications, and cooking.

The invention claimed is:

1. A method of coating an anode/collector with carbon nanotubes comprising the steps of:
    forming a coating comprised of carbon nanotubes onto an anode/collector by applying a carbonizable resin to the anode/collector and depositing carbon nanotubes onto the cabonizable resin;
    pyrobonding the coating onto the anode/collector by heating the anode/collector in a non-oxidizing atmosphere to a temperature sufficient to decompose the carbonizable resin and release volatile components;
    infiltrating the coating with carbon by pyrolysis through chemical vapor deposition; and
    removing any residual water from the coating.

2. An anode/collector coating method as defined in claim 1 wherein the pyrolysis through chemical vapor deposition includes directing a flow of low pressure hydrocarbon gas over the coating while heating the anode/collector to a temperature of over 1000° C.

3. An anode/collector coating method as defined in claim 2 wherein the depositing step is obtained by means of chemical vapor deposition.

4. An anode/collector coating method as defined in claim 1 wherein the anode/collector is heated to a temperature of over 700° C.

5. An anode/collector coating method as defined in claim 4 wherein the pyrolysis through chemical vapor deposition includes directing a flow of low pressure hydrocarbon gas over the coating while heating the anode/collector to a temperature of over 1000° C.

6. An anode/collector coating method as defined in claim 1 wherein the water removing step includes evaporating any residual water by baking the anode/collector in a vacuum oven.

7. An anode/collector coating method as defined in claim 6 wherein the pyro-bonding step includes heating the anode/collector to a temperature of over 700° C.

8. An anode/collector coating method as defined in claim 6 wherein the pyrolysis through chemical vapor deposition includes directing a flow of low pressure hydrocarbon gas over the coating while heating the anode/collector to a temperature of over 1000° C.

9. An anode/collector coating method as defined in claim 6 wherein the depositing step is obtained through vapor deposition.

10. An anode/collector coating method as defined in claim 1 wherein the water removing step includes heating the anode/collector to at least 100° C. in a vacuum.

11. An anode/collector coating method as defined in claim 1 wherein the depositing step is obtained through vapor deposition.

12. An anode/collector coating method as defined in claim 1 wherein the depositing step is obtained through chemical vapor deposition.

13. An anode/collector coating method as defined in claim 1 wherein the carbonizable resin is phenolic.

* * * * *